F. W. ERICKSON

June 3, 1930. ELECTRIC METER AND THE MOUNTING THEREOF Re. 17,694

2 Sheets-Sheet 1

Original Filed April 15, 1926

Inventor:
Frederic W. Erickson
by A. M. Harrison atty.

F. W. ERICKSON

June 3, 1930. ELECTRIC METER AND THE MOUNTING THEREOF Re. 17,694

2 Sheets-Sheet 2

Original Filed April 15, 1926

Inventor:
Frederic W. Erickson
by A. M. Harrison
atty.

Reissued June 3, 1930

Re. 17,694

UNITED STATES PATENT OFFICE

FREDERIC W. ERICKSON, OF LARCHMONT, NEW YORK, ASSIGNOR TO WESTINGHOUSE ELECTRIC & MANUFACTURING COMPANY, A CORPORATION OF PENNSYLVANIA

ELECTRIC METER AND THE MOUNTING THEREOF

Original No. 1,634,098, dated June 28, 1927, Serial No. 102,341, filed April 15, 1926. Application for reissue filed October 11, 1928. Serial No. 311,925.

This invention relates to the structure and mounting of electric meters, and has particular reference to features of compactness, and facility of mounting for use and of demounting for testing or repairs.

The most common type of watt meters most generally used at present comprises a somewhat cylindrical-shaped casing for the meter proper, superimposed on a rectangular shaped casing for the connecting and disconnecting devices. The vertical height of these two combined casings is considerable. When an office building or apartment house employs a large number of the meters, it being the practice to have a separate meter for each tenant, the practice is to group them all in one wall location, in a room for that purpose or in the basement; and to avoid occupying excessive lateral space the meters are mounted in rows, one above another. The result is that frequently the meters in the upper row are too high for convenient examination or attention and those in the lower row necessitate awkward stooping for the same purposes.

One of the objects of my present invention is to provide meters having such vertical compactness as to enable a large number of them to be installed in a group with all of them easily accessible for reading or removal; that is, none of them too high or too low.

When the hereinbefore mentioned present type of meter is to be tested, it is customary for the inspector or other employee to have with him portable testing instruments, and he must disconnect the meter wires and connect the testing wires from said instruments. This takes considerable time, and as the one capable of doing this work must be a high-class tester, there is considerable expense involved. Moreover his work frequently has to be done in dark and inconvenient locations. Therefore, a further object of my present invention is to provide a structure and mounting of the meters so that any unskilled employee can quickly remove a meter and replace it by another, or return the same meter after having it, possibly with others, examined and tested at the plant or laboratory of the company. Therefore the examination and testing can be made by a skilled employee who never has to leave the plant.

With the above objects in view, the invention consists in the construction and combination of parts substantially as hereinafter described and claimed.

Of the accompanying drawings:—

Similar reference characters indicate similar parts or features in all of the views.

Figure 1:
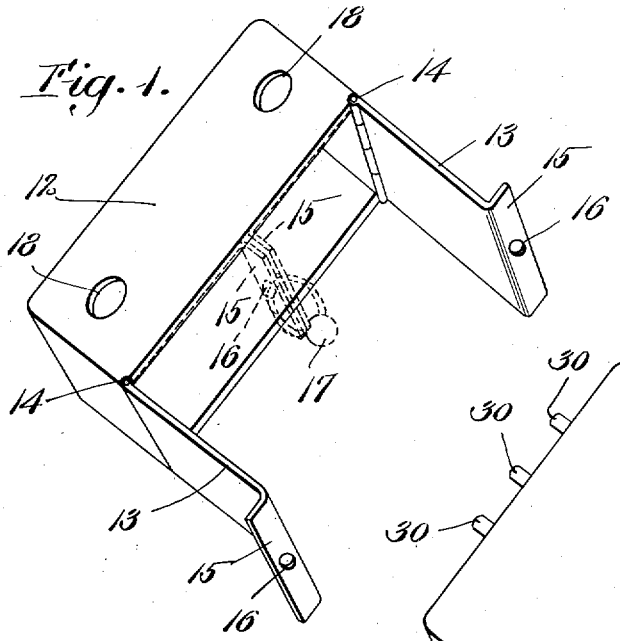
Figure 1 is a perspective view of my improved meter box or casing which is permanently secured to a wall or other support, its doors being illustrated by dotted lines as closed and by full lines as open to receive the meter.

Referring first to Figure 1, the casing 12 which when in place is secured to a wall or elsewhere has doors 13 hinged at 14 and having flanges 15 provided with holes 16. When the doors are closed as indicated by dotted lines in Figure 1, a seal of the usual type may be applied to the holes 16 as indicated at 17 so that when there is no meter mounted in the casing 12 the parts inside of said casing and hereinafter described cannot be tampered with to cause short-circuiting or other damage.

The holes 18 are for interconnecting wires.

Figure 3:
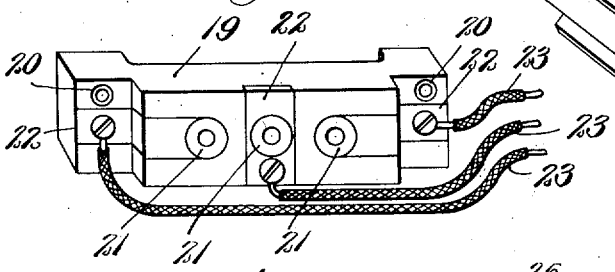
Figure 3 is a perspective view of parts which are contained at the back of the supporting casing.
Figure 5:
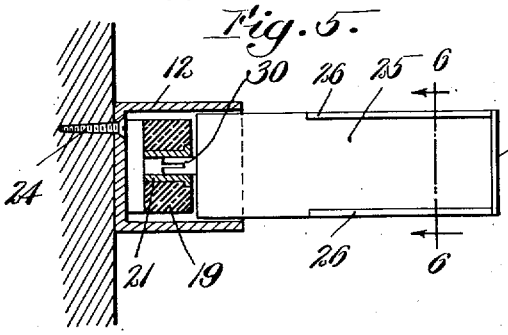
Figure 5 is a sectional view of the supporting casing and a side elevation of a meter extending thereinto.

Mounted in the rear of the casing 12 as indicated in Figure 5, is a block 19 of suitable insulating material. Said block (see Figure 3) has holes 20 for screws to hold the block in place, and supported by said block are sockets 21 in circuit with the terminal strips 22 to which the usual wires 23 are connected. The casing 12 is held in place by screws 24.

Figure 6:
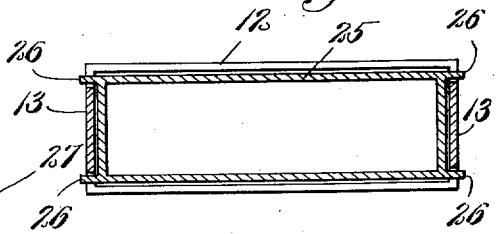
Figure 6 represents a section on line 6—6 of Figure 5.

The mechanism of the meter is contained in a shell 25 which is substantially rectangular in cross section and while of sufficient width to contain the meter parts relatively arranged as hereinafter described, is of but slight vertical height. The rear end of the shell 25 is shaped to snugly fit the casing 12. Side ribs 26 of the shell 25 are spaced to slide along the upper and lower edges of the casing doors 13 when the latter are open (see Figure 6). The two upper ribs 26, by resting on the upper edges of the doors 13, ensure retention of the meter fully supported. The front plate 27 of the meter shell has end flanges 28 provided with holes 29 which, when the meter is mounted in place as has been described, register with holes 16 in the flanges of the casing doors 13 so that, by applying seals as indicated at 31 in Figure 4, removal of the meter from its supporting casing can not be effected without showing that it has been tampered with.

Figure 2:
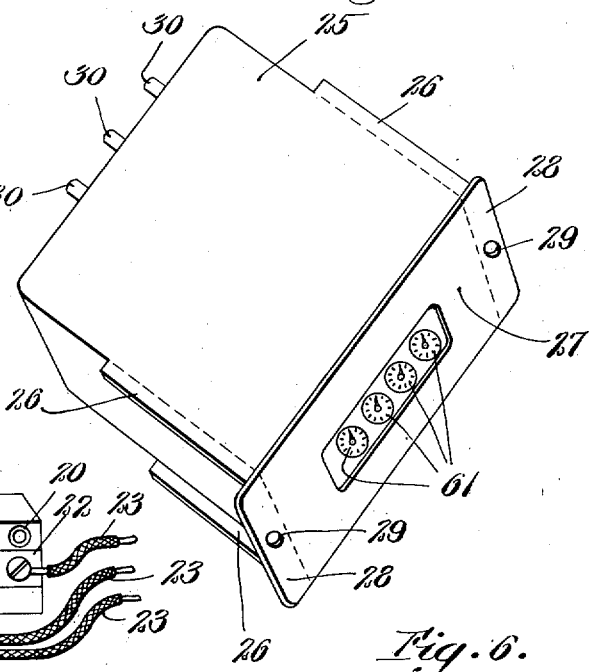
Figure 2 is a perspective view of the meter about to be mounted in its supporting casing shown by Figure 1.
Figure 7:
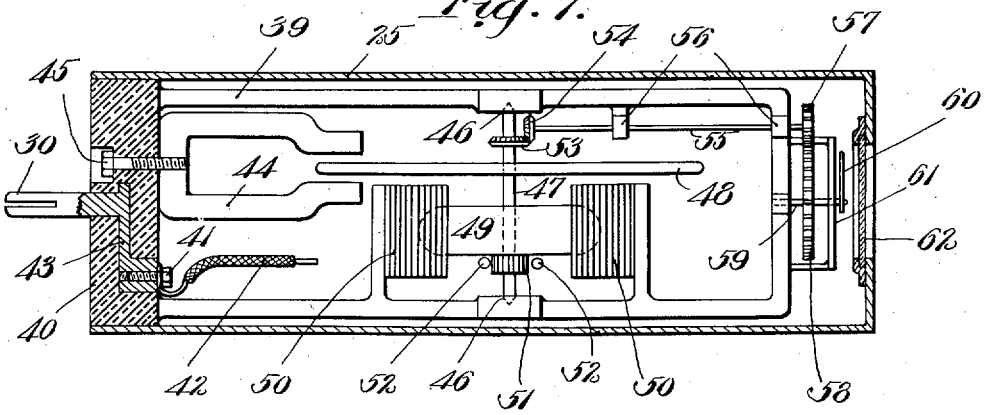
Figure 7 is a partial section and partial elevation of the meter, on a scale approximately full size.

Contact plugs or pins 30 project from the rear end of the meter (Figs. 2, 5 and 7) to enter the sockets 21. The mounting of said pins will be described presently.

A suitable frame for the various parts of the meter is indicated at 39. Mounted in the rear end of the shell 25 (Figure 7) is a block 40 of suitable insulating material. Binding screws 41 for the usual lead-in wires 42 engage conducting strips 43 from which the plugs or pins 30 project.

A permanent magnet 44 is mounted in horizontal position and held by a screw or bolt 45 extending through the insulating block 40. Upper and lower bearings 46 in the frame 39 are provided for a vertical arbor or spindle 47 which carries the aluminum disk 48 the margin of which extends into the space between the poles of the magnet 44. The arbor 47 also carries the armature 49 which rotates between field coils 50 suitably supported by the lower member of the frame 39. Said arbor also carries the commutator 51 opposite which are brushes conventionally indicated at 52. The novelty which is claimed resides in the proportioning and relative arrangements of said parts whereby extreme compactness as to the vertical dimension of the meter as a whole is obtained.

Figure 4:
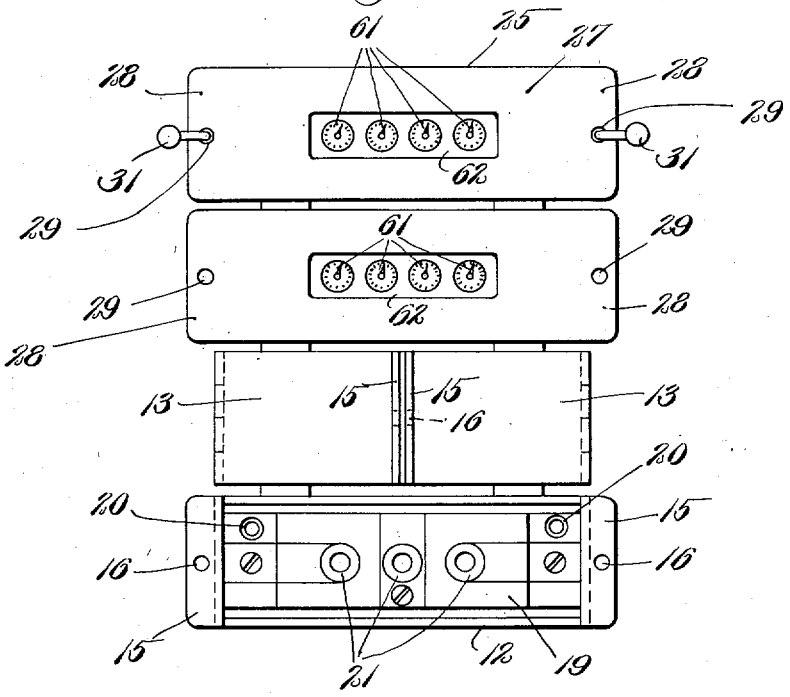
Figure 4 illustrates four of my meters or their supporting casings in compact relationship.

By means of bevel pinions 53, 54, the shaft 55 is rotated, said shaft being mounted in bearings 56 carried by the upper member of the frame 39, said shaft having a pinion 57 which meshes with the gear 58 carried by the arbor 59 of the indicator pointer 60 which coacts with the dial 61 to enable the meter to be read through a glass window 62. In practice, of course, the gearing is of the usual type to actuate the customary plurality of pointers for the row of dials indicated in Figure 2 and the two upper meters shown in the group mounting illustrated by Figure 4. In said Figure 4, there is supposed to be a meter supported by the upper one of four casings of the form shown by Figure 1, and sealed in place by seals 31 the wires of which are passed through registering holes 29 and 16. The next lower meter is supposed to be similarly mounted in a casing but not sealed. Below the last mentioned meter a casing with its doors closed but not sealed is illustrated, to indicate a casing from which a meter has been removed and ready to have its doors sealed together by a seal engaging the holes 16. At the bottom of Figure 4 there is illustrated a casing unoccupied but ready to have a meter inserted therein. The main object of Figure 4 is to illustrate how four meters can be mounted in such relative positions that all four occupy only about as much vertical space as a single meter of the type hereinbefore referred to as most commonly employed, when said meters are of the kind illustrated by Figure 7 and are mounted in casings such as illustrated by Figure 1.

In addition to the advantages due to the compactness described, an important advantage is that any meter which needs testing can be quickly removed bodily and, if desired, taken to the plant or laboratory for attention by a skilled tester, the casing from which such meter was removed being easily sealed against any mischief maker who might try to effect short-circuiting of the terminals within the casing, such sealing being effected when the doors 13 are closed as indicated by dotted lines, Figure 1. Then when said meter is returned, or if a new one is to be placed in such casing, the seal 17 is broken, the doors 13 opened, the meter pushed in with its ribs 26 sliding along the edges of the open doors and until its contact plugs or pins 30 enter the terminal sockets 31, and then seals such as indicated at 31 in Figure 4 are applied to the holes in the front plate 27, which holes are then in register with the holes 16 in the edge flanges 15 of the casing doors.

I claim as my invention:

1. The combination with a hollow receptacle having doors adapted to be sealed closed or to be opened to project in alinement with the sides of the receptacle, of an electric meter having side portions removably engaging said doors when the latter are open.

2. The combination with a receptacle having doors adapted to be opened to positions parallel with each other, of an electric meter a rear portion of which fits the inside of the receptacle, said meter having means coacting with said doors to support the front portion of the meter when the doors are open.

3. The combination substantially as specified by claim 2, means being provided for sealing the doors either closed when the meter is absent or in open position alongside and connected with the meter.

4. The combination with a rectangularly proportioned casing, of a correspondingly proportioned electric meter movable to and from said casing, the meter and casing having terminals in relative positions to contact and complete a circuit when the meter is in the casing.

5. The combination with a rectangularly proportioned casing, of a correspondingly proportioned electric meter movable to and from said casing, the meter and casing having terminals in relative positions to contact and complete a circuit when the meter is in the casing, said casing having means for sealing it when vacant.

6. The combination with a rectangularly proportioned casing, of a correspondingly proportioned electric meter movable to and from said casing, the meter and casing having terminals in relative positions to contact and complete a circuit when the meter is in the casing, means being provided for sealing the meter in position in the casing.

7. The combination with a rectangularly proportioned electric meter having projecting terminals, of a correspondingly proportioned meter-receiving casing having circuit-completing sockets to receive said meter terminals.

8. The combination with a group of superimposed electric meters the outer shells of which are of rectangular proportions, of a similar group of fixed casings, the meters being removably mounted in said casings, said meters and casings having correspondingly located cooperating terminals at the rear thereof.

9. The combination with a casing, of an electric meter having a portion thereof proportioned to be received within the casing in engagement with the side walls thereof, the meter and casing having terminals disposed to engage and complete a circuit when the meter is in operative position with respect to said casing.

10. The combination with a casing, of an electric meter having a portion thereof proportioned to be received within the casing in engagement with the side walls thereof, the meter and casing having electrical contacts disposed on the respective rear walls thereof and arranged to cooperate to close the circuit to the meter mechanism when the meter is in operative position in the casing.

11. The combination with a casing of an electric meter proportioned to be removably received in said casing, the meter and casing having terminals in relative positions to contact and complete a circuit by the operation of placing the meter in the casing, and means associated with the meter and the casing for guiding said terminals to contacting relation.

12. The combination with a casing adapted to be secured to a support, of an electric meter to be removably received in said casing and in engagement with the side walls thereof, electrical contacts carried by said meter and casing adapted to cooperate to close a circuit when the meter is in operative position, and means for sealing said meter in operative position.

13. The combination with a receptacle adapted to be secured to a support, of an encased electric meter having the rear end of the casing thereof proportioned to snugly fit in said receptacle, means for detachably securing said casing to said receptacle, and contact means carried by said casing and receptacle disposed to cooperate to complete a circuit to the mechanism of said meter when the meter is in operative position with respect to the receptacle.

14. The combination with an electric meter having contact members carried thereby, of means for detachably supporting said meter in operative position comprising a hollow receptacle proportioned to receive a portion of the meter in supporting relation, and contact members electrically connected to a circuit to be metered, disposed in said receptacle in position to engage the first mentioned contact members when the meter is in operative position.

15. The combination with an encased electric meter having contact pins projecting from the casing thereof, of a hollow receptacle having contact sockets mounted therein, said casing and receptacle being so proportioned that a portion of the casing may be inserted into said receptacle in supported relation and said contact pins moved into engagement with said sockets coincident with said insertion.

16. The combination with a receptacle, of an electric meter proportioned to be removably received in said receptacle in supported relation, the meter and receptacle having terminals in relative positions to contact and complete a circuit when the meter is in the receptacle, and means for sealing the meter in position in said receptacle.

In testimony whereof, I have hereunto subscribed my name this 25th day of October, 1928.

FREDERIC W. ERICKSON.